US011031815B2

(12) United States Patent
Reinger

(10) Patent No.: US 11,031,815 B2
(45) Date of Patent: Jun. 8, 2021

(54) WIRELESSLY RECHARGEABLE ENERGY STORE

(71) Applicant: Tecflower AG, Feusisberg (CH)

(72) Inventor: Sascha Reinger, Feusisberg (CH)

(73) Assignee: Tecflower AG, Feusisberg (CH)

( * ) Notice: Subject to any disclaimer, the term of this patent is extended or adjusted under 35 U.S.C. 154(b) by 316 days.

(21) Appl. No.: 16/090,964

(22) PCT Filed: Mar. 22, 2017

(86) PCT No.: PCT/EP2017/056812
§ 371 (c)(1),
(2) Date: Oct. 3, 2018

(87) PCT Pub. No.: WO2017/174359
PCT Pub. Date: Oct. 12, 2017

(65) Prior Publication Data
US 2020/0328613 A1    Oct. 15, 2020

(30) Foreign Application Priority Data

Apr. 4, 2016  (CH) .................................... 00435/16
Oct. 28, 2016 (CH) .................................... 01446/16

(51) Int. Cl.
*H02J 50/00* (2016.01)
*H02J 50/10* (2016.01)
(Continued)

(52) U.S. Cl.
CPC ....... *H02J 50/005* (2020.01); *H01M 10/4257* (2013.01); *H01M 10/44* (2013.01);
(Continued)

(58) Field of Classification Search
CPC ........ H02J 50/005; H02J 50/10; H02J 7/0042; H02J 50/40; H02J 50/402; H01M 10/4257; H01M 10/44; H01M 10/46
(Continued)

(56) References Cited

U.S. PATENT DOCUMENTS 6,640,084 B2 * 10/2003 Pande ...................... H01Q 1/02
                                                                361/688
7,433,177 B2 * 10/2008 Tsao ...................... G06F 3/0202
                                                                345/168
(Continued)

FOREIGN PATENT DOCUMENTS

EP        1895450 A2     3/2008

OTHER PUBLICATIONS

English translation of International Preliminary Report on Patentability dated Oct. 9, 2018 with Written Opinion for PCT/EP2017/056812 filed Mar. 22, 2017.
(Continued)

*Primary Examiner* — M Baye Diao
(74) *Attorney, Agent, or Firm* — Paul D. Bianco; Gary S. Winer; Fielt Intellectual Property Law

(57) ABSTRACT

A wirelessly rechargeable energy store includes a housing, having a casing wall, in which a converter, a storage core, charging electronics and an antenna structure are arranged along a longitudinal axis. The energy store, independently of the relative alignment of antenna structures used with respect to the acting field direction, achieves an increased recharging efficiency and, because of its housing configuration, is diversely usable as a replacement for batteries and battery packs in small electrical devices. The antenna structure comprises at least two induction loops—shaped from an electrically conductive wire—formed as flat coils, which are arranged in a partly overlapping manner on a flexible printed
(Continued)

circuit board. The printed circuit board together with the induction loops at least partly encloses the storage core in such a way that loop longitudinal extents run at least approximately parallel to the longitudinal axis and loop transverse extents run at least approximately perpendicularly to the longitudinal axis and a first pole of the induction loops is connected to a first pole of the converter and a second pole of the induction loops is connected to a second pole of the converter.

17 Claims, 4 Drawing Sheets

(51) Int. Cl.
    *H01M 10/42*     (2006.01)
    *H01M 10/44*     (2006.01)
    *H01M 10/46*     (2006.01)
    *H02J 7/00*     (2006.01)

(52) U.S. Cl.
    CPC .......... *H01M 10/46* (2013.01); *H02J 7/0042* (2013.01); *H02J 50/10* (2016.02)

(58) Field of Classification Search
    USPC .......................................................... 320/108
    See application file for complete search history.

(56) References Cited

U.S. PATENT DOCUMENTS

| | | | |
|---|---|---|---|
| 9,621,230 B2* | 4/2017 | Ouyang | H04B 5/02 |
| 9,637,014 B2* | 5/2017 | Schneider | B60L 53/38 |
| 9,676,285 B2* | 6/2017 | Niederhauser | B60L 53/122 |
| 10,263,468 B2* | 4/2019 | Schmitz | H04B 5/0081 |
| 2013/0175982 A1 | 7/2013 | Teggatz et al. | |
| 2014/0002012 A1 | 1/2014 | McCauley et al. | |
| 2014/0176067 A1 | 6/2014 | Suzuki et al. | |
| 2014/0333152 A1 | 11/2014 | Kawano et al. | |
| 2017/0077763 A1 | 3/2017 | Osada | |

OTHER PUBLICATIONS

International Search Report dated Jun. 16, 2017 for PCT/EP2017/056812 filed Mar. 22, 2017.
Written Opinion for PCT/EP2017/056812 filed Mar. 22, 2017.

* cited by examiner

WIRELESSLY RECHARGEABLE ENERGY STORE

TECHNICAL FIELD

The present invention describes a wirelessly rechargeable energy store comprising a housing, having a casing wall in which a converter, a storage core, a set of charging electronics and an antenna structure are arranged along a longitudinal axis, and a production method for a wirelessly rechargeable energy store having a housing and a longitudinal axis, comprising a converter, a storage core, a set of charging electronics and an antenna structure.

STATE OF THE ART

A wide range of electrical batteries and accumulators are commercially available, which can be used in a variety of battery-powered electrical consumers.

The terms battery and accumulator are used synonymously in this application to designate rechargeable primary cells, super capacitors and rechargeable secondary cells. If a plurality of cells is connected together this is called a battery pack, which is also meant here to be synonymous with the term battery. In the battery electrical energy can be stored electro-chemically in a corresponding storage core. In doing so, the battery is usually composed of a plurality of secondary cells, which is equivalent to a battery pack.

In recent years, storage cores with capacitors have additionally been used in batteries or accumulators, wherein the electrical energy in this case is stored in an electric field of the capacitor. The electrical energy can be extracted from the electrical energy store as required. Here also, battery packs comprising a plurality of capacitors or super-capacitors can be created.

The housings of the electrical energy stores are adapted to common standardized sizes (ANSI standard), resulting in a manageable number of available housings with defined designs of the housing, suitable for different designs of small electrical appliances. Energy stores such as batteries based on the various storage cores can be used in different sizes of, usually portable, small electrical appliances ranging from the hearing aid through mobile phones, portable computers, cameras, remote controls to alarm clocks and children's toys. The energy store holders of these devices are adapted to the available designs of batteries from the button cell up to the 9V block, and the electronics of the devices are matched to the performance characteristics, such as nominal voltage and capacity of the energy stores.

Due to the increased use of rechargeable batteries, the production and distribution of non-rechargeable primary cells, and thus disposable batteries, can be reduced. Rechargeable batteries are now preferred for use in small electrical appliances, since these can be easily recharged with the appropriate charging devices. Often, small electrical appliances in common use today are equipped with a set of charging electronics, so that the inserted rechargeable batteries can remain in the device during charging, while a controlled re-charging of the energy store can take place. This is especially the case, for example, with cordless telephones and mobile telephones. From an outside source, electrical energy in the form of a supply voltage and charging current is fed in and the rechargeable battery is thereby recharged. The energy stores must be designed to be mechanically robust and in the case of mobile uses, as light as possible and usable in any position, wherein discharging must be prevented.

To further simplify the charging process, batteries are currently charged wirelessly where possible. This wireless or contactless energy transfer or power transfer can nowadays be achieved using various modes of transmission in the far field 400 cm distance from energy store to charging device) or in the near-field 20 cm distance from energy store to charging device) from different sources. Electromagnetic fields transfer the energy from the source to the electrical energy store.

There are charging devices available commercially, on which a mobile phone, smartphone, Personal Digital Assistants, navigation devices or tablet computers can be simply placed, and the charging process begins immediately. This requires a charging electronics, which is connected to a transmitter coil. In induction reception means, for example of the mobile telephone, the alternating current in the transmitter coil induces an alternating voltage. The alternating voltage in the induction reception means is rectified and fed via a charging electronics to the battery pack of the mobile telephone to charge it.

In addition to an inductive coupling of the transmitter coil and induction reception means, a resonant inductive coupling can also be carried out. These methods have been implemented for some time now and standards have become established by means of which different smartphones from various manufacturers can be charged on different chargers by means of induction or inductive coupling, irrespective of the manufacturer of the respective user device.

Document US 2014/0002012 describes a wirelessly rechargeable energy store 1. As shown in FIG. 1, this energy store 1 has a cylindrically shaped housing 10, in which a storage core 11 in the form of a battery is located. The housing 10 is modelled on a standard battery housing, for example, a so-called AAA or AA battery, wherein a positive terminal P and a negative terminal N are each accessible from the outside and both poles are connected to the battery 11 within the housing 10. The induction reception means used is an induction coil 140 in the form of an electrical conductor which is wound helically around the longitudinal axis L of the battery 11 or housing 10 in a plurality of windings. The windings of the induction coil 140 are arranged coaxially to the longitudinal axis L and are routed from the negative terminal N in the direction of the positive terminal P, in each case fully surrounding the battery 11. The maximum winding width and the number of turns are determined by the height h of the housing 10. The induction coil 14 is designed as a single layer and has empty spaces in the windings over the course of the longitudinal axis L.

The attainable efficiencies of the energy transfer do not yet meet the desired values. Changing between right- and left-handedness of the winding of the induction coil 140 coaxially around the longitudinal axis was not able to show any improvements. Since a multi-layer winding is difficult to achieve due to the given housing thickness, in this case a simple improvement using multiple tightly-packed coil windings is not possible.

In US 2014176067 a rechargeable energy store according to the preamble of the first claim is disclosed. The achievable induction however is not sufficiently efficient, so that the recharging capacity does not yet function as desired. It also appears that the production of such rechargeable energy stores is difficult and/or costly.

Also, if it is intended to use radiated power from near-field and far-field radiation, for example from radio services ranging from RFID transmitters to Wi-Fi transmitters, antenna structures with an induction coil according to US2014176067 are not sufficient to charge batteries in a reasonable period of time.

SUMMARY OF THE INVENTION

The object of the present invention is to create a wirelessly rechargeable energy store in which an improved position-independent charging can be achieved regardless of the relative orientation of an antenna structure with respect to the effective field direction of the external electromagnetic field, thereby increasing the efficiency of the recharging process, wherein the design of the housing is such that it emulates the shape of batteries and battery packs for small electrical appliances.

This allows the rechargeable energy store to be recharged without specific orientation. The antenna structure is intended to have a maximum energy transfer efficiency regardless of the relative position of the energy store with respect to the transmitter coil or charging electronics.

In addition, a solution has been sought to simplify its production, enabling such wirelessly rechargeable energy stores to be produced more easily and quickly.

This object is achieved by a device having the features of claim 1. The specific design of the housing ensures an optimal compatibility with all types of small electrical appliances, and the special shape of the antenna structure allows an optimized energy absorption and therefore improved wireless charging of the battery pack to be achieved without the size of the battery pack or the housing needing to be changed.

By means of differently-shaped antenna structures comprising, for example, induction loops which are partially overlapping to form an outer casing wall, it is possible to match the device to the frequency and energy of the external electromagnetic radiation.

BRIEF DESCRIPTION OF THE DRAWINGS

A preferred exemplary embodiment of the subject matter of the invention is described in the following in conjunction with the attached drawings.

FIG. 3a shows a perspective view of an energy store with an antenna structure on a printed circuit board, comprising an induction loop as an induction means in a first embodiment prior to being rolled up, while

FIG. 5a shows a perspective view of a wirelessly rechargeable energy store prior to manufacture with an antenna structure consisting of three induction loops arranged in a partially overlapping manner in the form of flat coils, while

DETAILED DESCRIPTION

Figure 1:
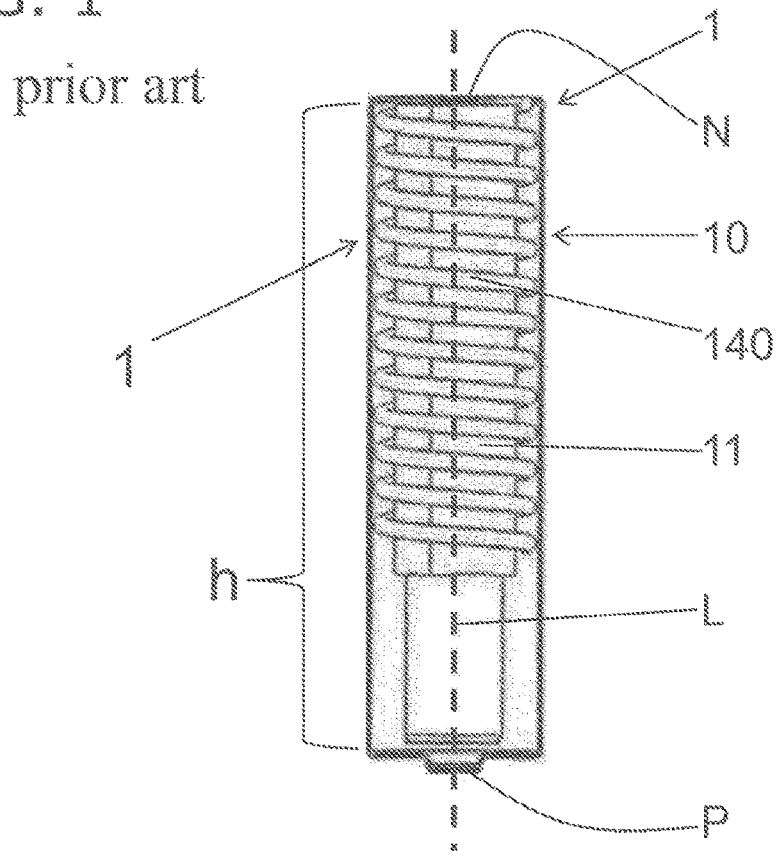
FIG. 1 shows a schematic perspective view of a known wirelessly rechargeable energy store from the prior art.
Figure 2:
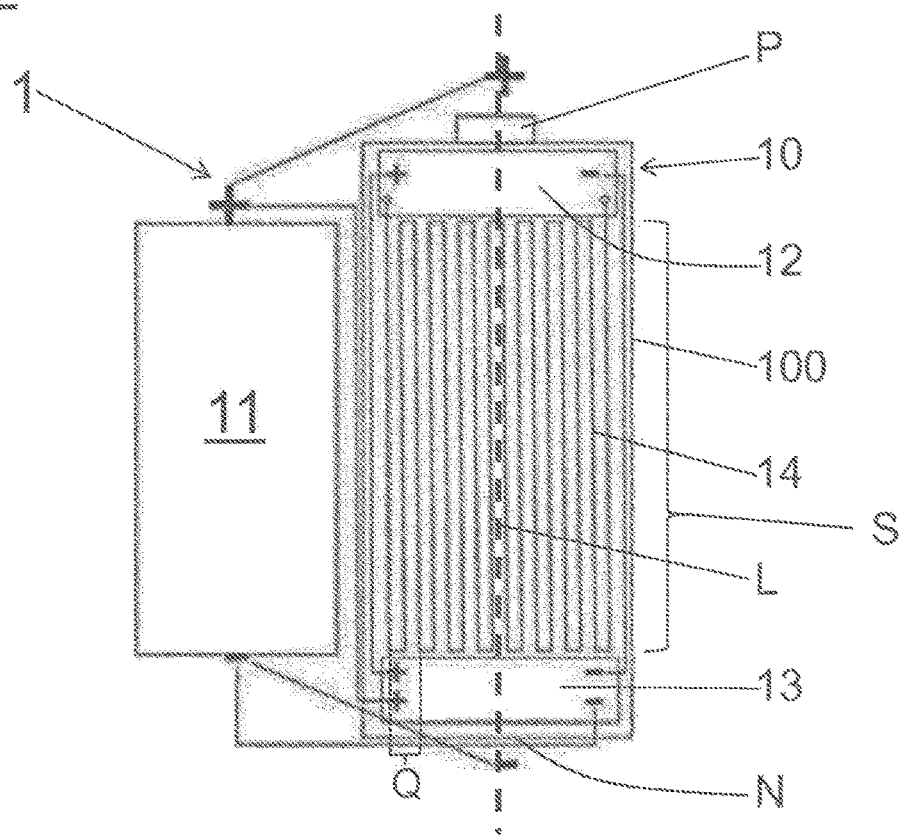
FIG. 2 shows a schematic view of an energy store according to the invention.

FIG. 2 shows a wirelessly rechargeable energy store 1 shown schematically, which by way of example, is here designed cylindrically. In a housing 10, which is formed by a cylindrically shaped casing wall 100, a converter 12, an antenna structure in the form of an inductive loop 14 and a charging electronics 13 are arranged along a longitudinal axis L between a positive terminal P and a negative terminal N. To allow better illustration a storage core 11 is here shown removed from the housing 10.

The storage core 11 can comprise a battery, a battery pack in which electric energy can be stored by electro-chemical means, or at least one capacitor or super-capacitor in which electrical energy is stored in the form of an electric field. The positive terminal P is connected to a positive terminal of the storage core 11, a positive terminal of the charging electronics 13 and a positive terminal of the converter 12. The negative terminal N of the energy store 1 is correspondingly connected to a negative terminal of the storage core 11, a negative terminal of the charging electronics 13 and a negative terminal of the converter 12.

The storage core 11 is rechargeable, by virtue of a received alternating voltage being generated in the antenna structure by means of an external alternating electromagnetic field of frequency $f=c/\lambda$ either in the near-field (<wavelength/$2\pi$) by inductive coupling, or in the far field range (>wavelength/$2\pi$) by irradiation, wherein in this example antenna structure is the induction loop 14. The received alternating voltage is converted into a DC voltage by the converter 12 and supplied to the charging electronics 13. By means of the charging electronics 13 a DC voltage is applied to the storage core 11 in a controlled manner, thereby charging said core. Embodiments of the converter 12 and the charging electronics 13 are known to the person skilled in the art.

For processing induction and radiation, the antenna structure, in the form of an inductive loop 14, as an electrical conductor placed in loops, is arranged such that it extends within the housing 10 between the charging electronics 13 and the converter 12. The inductive loop 14 runs between the positive terminal of the converter 12 and the negative terminal of the converter 12. The inductive loop 14 is designed as a flat coil 14, which here is arranged on a flexible printed circuit board as a casing wall 100. The flat coil 14 can be applied on the printed circuit board 100 as a single piece and fixed there, or else be printed thereon. The flexible printed circuit board 100 forms the casing wall 100, so that no additional covering and no additional wall needs to be placed around the inductive loop 14 to form the housing 10.

In the installed condition the storage core 11 is surrounded by at least one such inductive loop 14 and/or the flexible printed circuit board 100 at least once. The inductive loop 14 in this case is designed such that a loop longitudinal extent S runs at least approximately parallel to the longitudinal axis L, while a loop transverse extent Q runs at least approximately perpendicular to the longitudinal axis L.

Figure 3A:
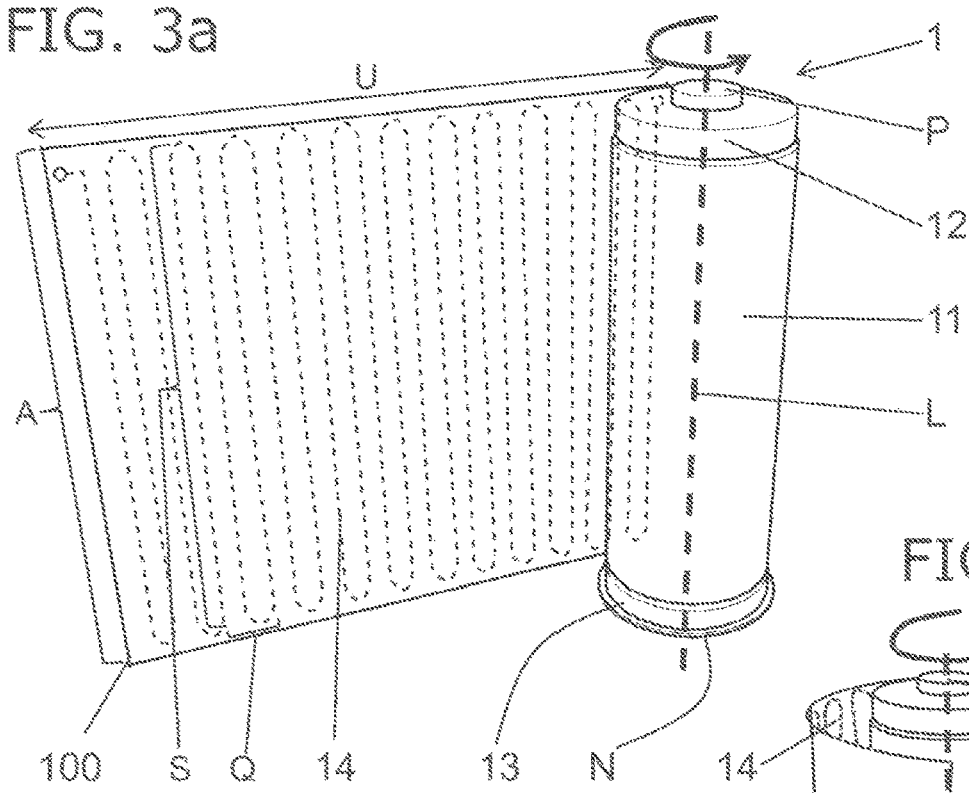

The loop formation can be understood better from FIG. 3a. Here a casing wall 100 with a longitudinal extent A and a circumferential extent U is shown, to which the induction loop 14 is fastened or bonded. The loop longitudinal extent S runs parallel to the longitudinal extent A of the casing wall 100, and therefore in the finished state is approximately parallel to the longitudinal axis L. The loop transverse extent Q runs parallel to the circumferential extent U of the casing wall 100, and therefore in the finished state runs in a plane perpendicular to the longitudinal axis L.

As indicated with the solid arrow, the casing wall 100 and the inductive loop 14 are wrapped around the converter 12, the storage core 11 and the charging electronics 13, until the casing wall 100 forms the closed housing 10 of the energy store 1.

The manufacturing process of a wirelessly rechargeable energy store 1 proceeds as follows:

Firstly, the components converter 12, storage core 11 and charging electronics 13 are electrically connected to each other in accordance with the diagram of FIG. 2. One terminal of the antenna structure is then connected to the corresponding terminal of the converter 12. The antenna structure is then wrapped around the components coaxially to the longitudinal axis L and the second, still free terminal of the antenna structure is connected to the corresponding terminal of the converter 12. Since the antenna structure is arranged on the printed circuit board 100 which forms the casing wall 100, the casing wall 100 then only needs to be wrapped coaxially around the longitudinal axis L, which closes the housing 10. Since the antenna structure has been fixed to the peripheral wall 100 in advance, the enveloping of the antenna structure and the peripheral wall 100 is performed in one processing step.

Figure 3B:
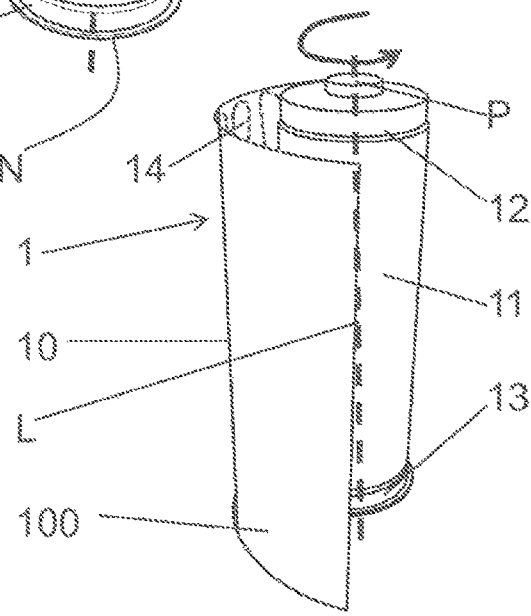
FIG. 3b shows the energy store according to FIG. 3a shortly before the manufacture and the sealing of the housing.

Shortly before completed assembly, the still open housing 10 appears as shown in FIG. 3b. In this case, the casing wall 100 together with the antenna structure in the form of the induction loop 14 still needs to be completely wrapped, the open loop terminal needs contacting and then the housing 10 sealed.

The fixing of the antenna structure to the inner side of the casing wall 100 or to the printed circuit board 100 can be carried out using glue or adhesive film. The fastening of the casing wall 100 and thus the formation of a sealed housing 10, by the attachment of both ends of the casing wall 100, is usually carried out by means of welding or bonding. In order to obtain the electrically conductive contacts, options exist that are known to the person skilled in the art.

Figure 4:
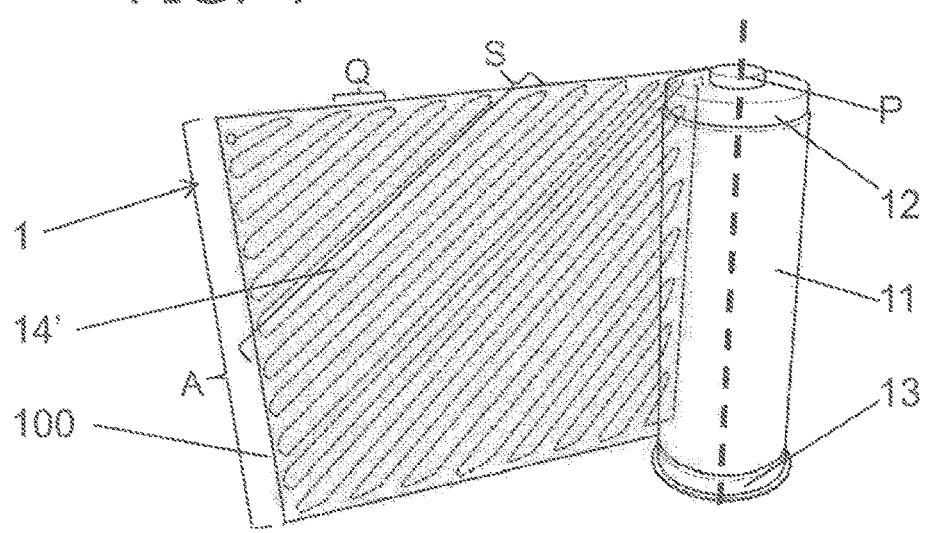
FIG. 4 shows an energy store with a slightly modified induction loop with a tilted loop longitudinal extent before assembly.

In FIG. 4 the energy store 1 is shown with a modified induction loop 14'. The orientation of the loop longitudinal extent S here is tilted towards the longitudinal extent A of the casing wall 100, and thus with respect to the longitudinal axis L. Even in such an electrical conductor which is laid to form the inductive loop 14' an induction voltage due to an alternating electromagnetic field is generated, which can be used to recharge the storage core 11. Depending on the configuration of the loop structure, the induction loop 14' can be tuned to selected external electromagnetic alternating fields, so that a maximum efficiency can be obtained. Here, also, the induction loop 14' can be arranged in the housing 10 resting against the casing wall 100 wrapped around the longitudinal axis L. The contacting is effected in the manner described above.

If there is sufficient space in the housing 10, it is possible to modify the antenna structure such that it comprises a plurality of induction loops 14, 14', which come to rest next to one another or partially on top of one another, and then to wrap it around the longitudinal axis L as described. This enables the energy that can be absorbed from the magnetic field of the external alternating electromagnetic fields to be increased.

To optimize the recharging of the energy store 1, two induction loops 14, 14', or more than two induction loops 14, 14' 14", are arranged as an antenna structure on the flexible printed circuit board 100, which forms a casing wall 100. An example of this is shown in FIG. 5a.

The induction loops 14, 14' 14" are each implemented as flat coils which are arranged partially overlapping on the flexible printed circuit board 100 as the casing wall 100. The loop longitudinal extents S of the induction loops 14, 14' 14" run approximately parallel to each other and parallel to the longitudinal axis L. Depending on the number of induction loops implemented as flat coils 14, 14' 14" and the degree of overlap, a corresponding number of coil planes are formed on the flexible printed circuit board 100 perpendicular to the printed circuit board 100 and protruding away from it. As shown in FIG. 5b, due to the partial overlap, some of the flat coils 14, 14' 14" are different distances away from the plane of the printed circuit board 100.

Figure 5A:
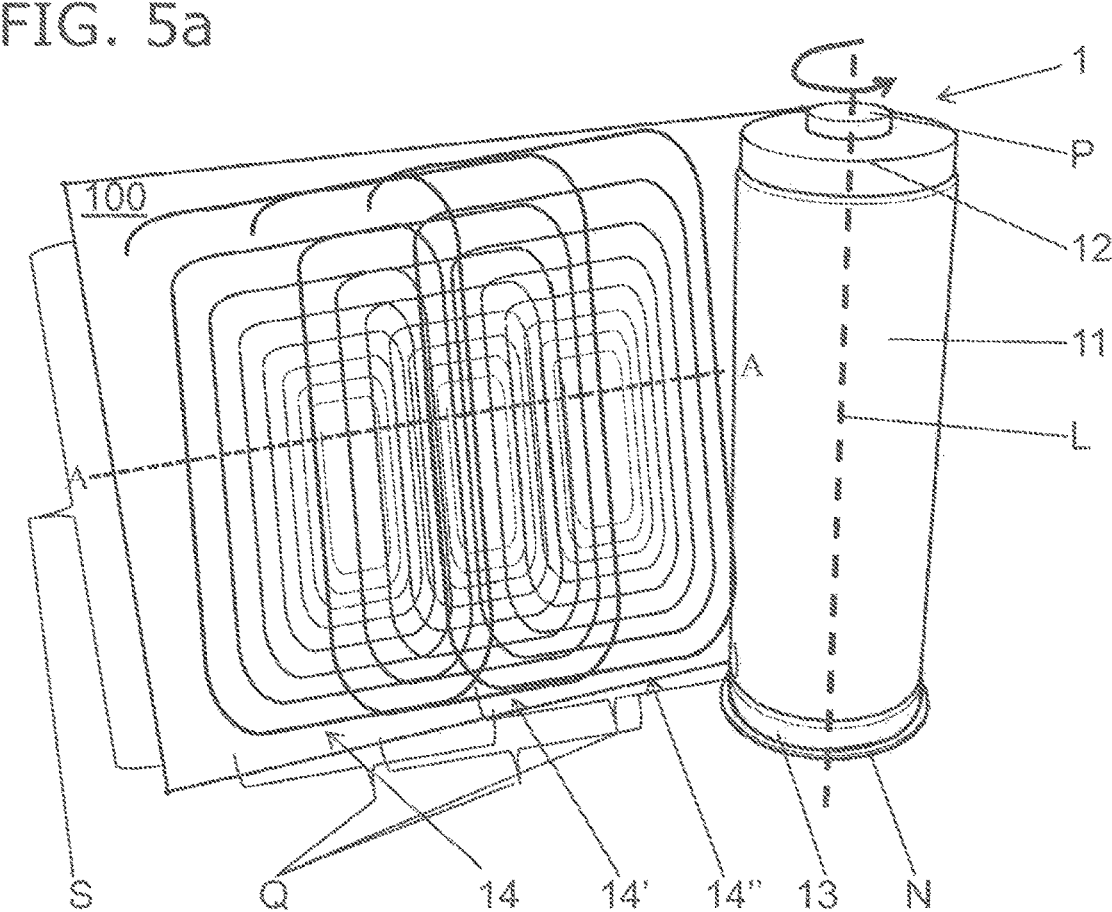
Figure 5B:
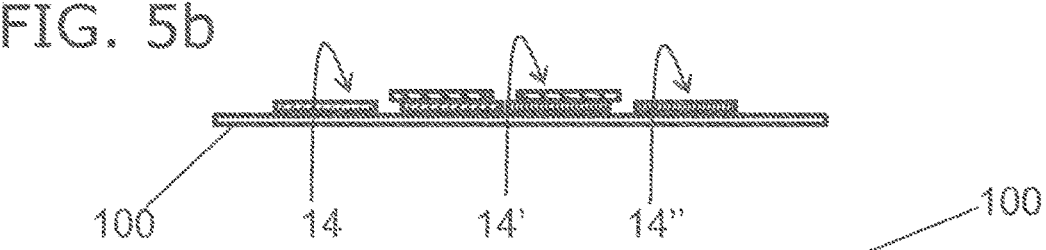
FIG. 5b shows a cross-sectional view along line A-A of FIG. 5a through the printed circuit board.

In the rolled-up condition, as indicated by the arrow in FIG. 5a, the printed circuit board together with the antenna structure with at least two induction loops 14, 14' at least partially encloses the storage core 11. The induction loops 14, 14' 14" in the rolled-up condition of the printed circuit board face in the direction of the interior of the housing 10 and hence in the direction of the storage core 11, converter 12 and charging electronics 13. The loop longitudinal extents S of the flat coils 14, 14' 14" in this case run at least approximately parallel to the longitudinal axis L, while the loop transverse extents Q run at least approximately perpendicular to the longitudinal axis L. First terminals of the induction loops 14, 14' 14" are connected directly or indirectly to a first pole of the converter 12 and second terminals of the induction loops 14, 14' 14" are connected to a second terminal of the converter 12. Optionally, a separate converter 12 could be provided for each flat coil.

In the rolled-up condition the rear of the flexible printed circuit board 100 forms the outer face of the casing wall 100 and thus the outer face of the housing 10. Due to this curved printed circuit board 100, the storage core 11, converter 12, charging electronics 13 and the flat coils 14, 14' 14" are protected from the outside. The at least two induction loops 14, 14' 14" partly overlap the storage core 11 in the circumferential direction, wherein the loop longitudinal extents S run at least approximately parallel to the longitudinal axis L and the loop transverse extents Q run at least approximately perpendicular to the longitudinal axis L.

Experiments have shown that an overlap of adjacent induction loops 14, 14' 14" by 20% or more of their surface areas along the casing wall 100, when two or more induction loops 14, 14' 14" are used, already lead to improved charging results.

In the sectional view of FIG. 5b along line A-A of FIG. 5a through the printed circuit board, it is apparent that an inductive loop 14' at least partly overlaps the other induction loops 14, 14' in an elevated position.

Figure 6:
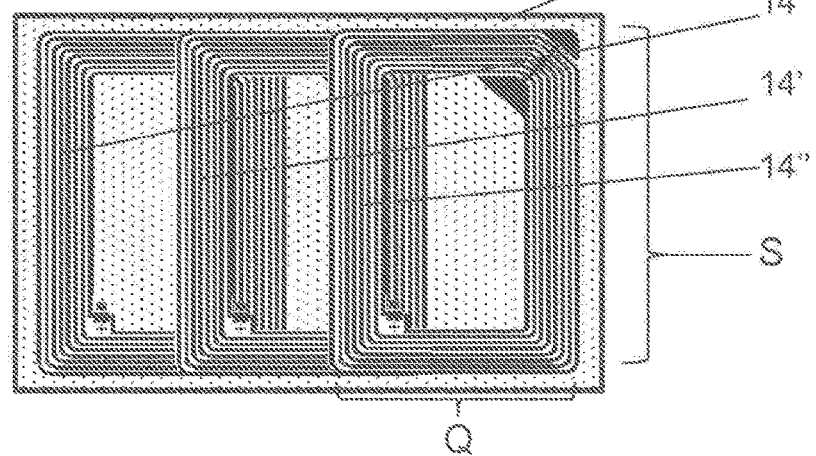
FIG. 6 shows a printed circuit board with an antenna structure comprising three induction loops overlapping in the plane, as they are specifically embodied.

In practice, the antenna structure is designed as shown in FIG. 6a, wherein methods for producing the induction loops 14 on flexible printed circuit boards 100 are known to the person skilled in the art. The almost rectangularly shaped flat coils 14, 14' 14" are made to be resonant at the excitation frequency by means of a capacitance, in order to obtain a corresponding excess voltage which supplies the converter 12 with a higher voltage, wherein the flat coils 14, 14' 14" can go into resonance at the excitation frequency and both irradiation and induction can be used for generating a charging current. The overlap of adjacent induction loops 14, 14' 14" is selected in such a way that the conductor-track-free or coil-wire-free centre remains at least partially exposed, i.e. is not overlapped by a neighbouring inductive loop 14, 14' 14'. The shell wall 100 with the induction loops 14, 14' 14", in the form of the rectangular flat coils, is used as a housing wall and is wrapped around the storage core 11 and other internal components.

If the casing of the storage core consists of conductive material such as metal, magnetic alternating fields are subject to eddy current losses. Therefore, in this case it is necessary to insert an insulating spacing layer of a few millimetres or more or a foil made of flexible magnetic material, known as an RFID magnetic sheet, between the antenna structure and the casing of the core. Both methods allow the field lines incident perpendicular to the loop surface to pass through the induction loop, and thus enable the induction. The antenna structures in FIGS. 4 and 5 exploit purely inductively usable near-field radiation from the kHz range through the MHz range, for example 13.56 MHz from the RFID range. Higher frequencies have the advantage that the number of windings of the induction loops are lower and their production using single-layer films becomes feasible.

As experiments have also shown, when using super-capacitors as the storage core 11, it is possible to use the electromagnetic radiation in the far field of alternating fields, as an example based on WLAN stations (Wi-Fi), for charging. Given an appropriate design the at least one induction loop 14, 14' 14" can be used to convert energy from the WLAN radiation and thus to charge the super-capacitor almost constantly, whenever WLAN radiation is broadcast. Since no memory effect occurs in super-capacitors, a constant low-level charging energy can be supplied without any harmful effect on the super-capacitor. Even if due to free-space attenuation only low efficiencies can be achieved, a continuous charging of super-capacitors is possible.

To enable far-field radiation to be used, for example Wi-Fi, the antenna structure can be extended.

Figure 7A:
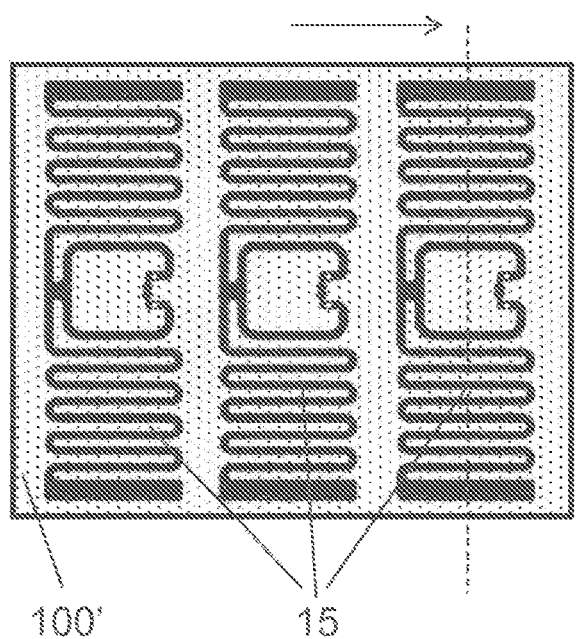
FIG. 7 shows an antenna structures which comprise dipoles arranged on a printed circuit board, wherein different structural forms of the dipoles are possible.
Figure 7B:
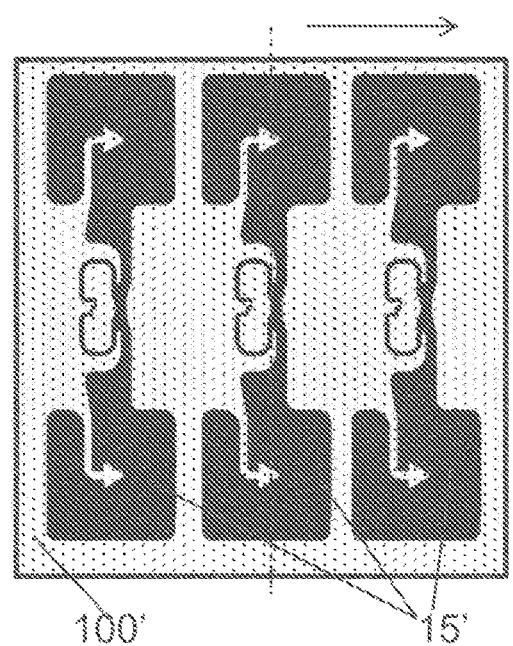

On the printed circuit board 100, which is used as a casing wall, a plurality of dipoles 15 should be mounted, as shown in FIGS. 7a and 7b. The dipoles 15 are connected using conductor tracks, not shown, via the at least one converter 12 to the at least one set of charging electronics 13. The specific form of the dipoles 15 is variable, wherein the design is adjusted to match the expected wavelength or transmission frequency of the radiation, and for an efficient conversion have as high an active surface area as possible, known as antenna gain.

In FIG. 7a for example a plurality of meander-shaped dipoles 15 is shown, which have meander-shaped in conductor tracks in the plane of the paper, wherein all dipoles 15 are oriented parallel to each other and spaced apart. The conductor tracks of each dipole 15 are folded in the plane of the paper, so that the resulting length of the conductor tracks is matched to a fraction of the wavelength of the radiation (preferably ½).

FIG. 7b shows so-called dog-bone shaped dipoles 15', which forms another group of known dipoles. Optionally however, the outer shape of the dipoles 15' can be more dumbbell-shaped, wherein here also adjacent dipoles 15' are arranged spaced apart from each other on the printed circuit board 100'.

In principle the dipoles 15, 15' are designed in such a way that they are in resonance with the incident radiation and matched to the impedance of the at least one converter 12.

The at least two dipoles 15, 15' provide a rotation-independent charging facility, in which there is always at least one dipole that is not covered by the casing of the storage core 11. In the case of batteries with larger diameters the number of dipoles 15, 15' is increased, so that the casing wall 100 is optimally utilized. The calculation of the distances from the casing of the storage core and the battery as well as the choice of material of the intermediate layers are derived from the antenna design in ways known to the person skilled in the art from high-frequency engineering.

Instead of dipoles, other known antenna types which can be designed in flat form can be used, such as inverted-F or patch, which are applied as a printed circuit on a single- or multi-layer flexible printed circuit board 100.

Preferably, the dipoles 15, 15' and the induction loops 14 are combined as an antenna structure and arranged on a casing wall 100. In such a case, the dipoles 15, 15' should each be positioned in the track-free centre of the induction loops 14, as a result of which space can be saved while all components are placed on the flexible printed circuit board 100 and the dipoles are not covered by the induction loops 14. The dipoles 15, 15' can optionally be mounted, preferably printed, on the same printed circuit board 100, or on a separate printed circuit board 100'. The longitudinal direction of the dipoles 15, 15' should be oriented perpendicular to the wrapping direction of the casing wall 100 or parallel to the longitudinal axis L of the subsequently wirelessly rechargeable energy store 1, which is indicated by the dashed line and the arrow.

As a further option at least one turnstile antenna 16 could be arranged, preferably in the track-free centre of an induction loop 14, and form a corresponding antenna structure. The at least one turnstile antenna 16 is also connected using conductor tracks, not shown, to the at least one set of charging electronics 13 via the at least one converter 12.

Figure 8:
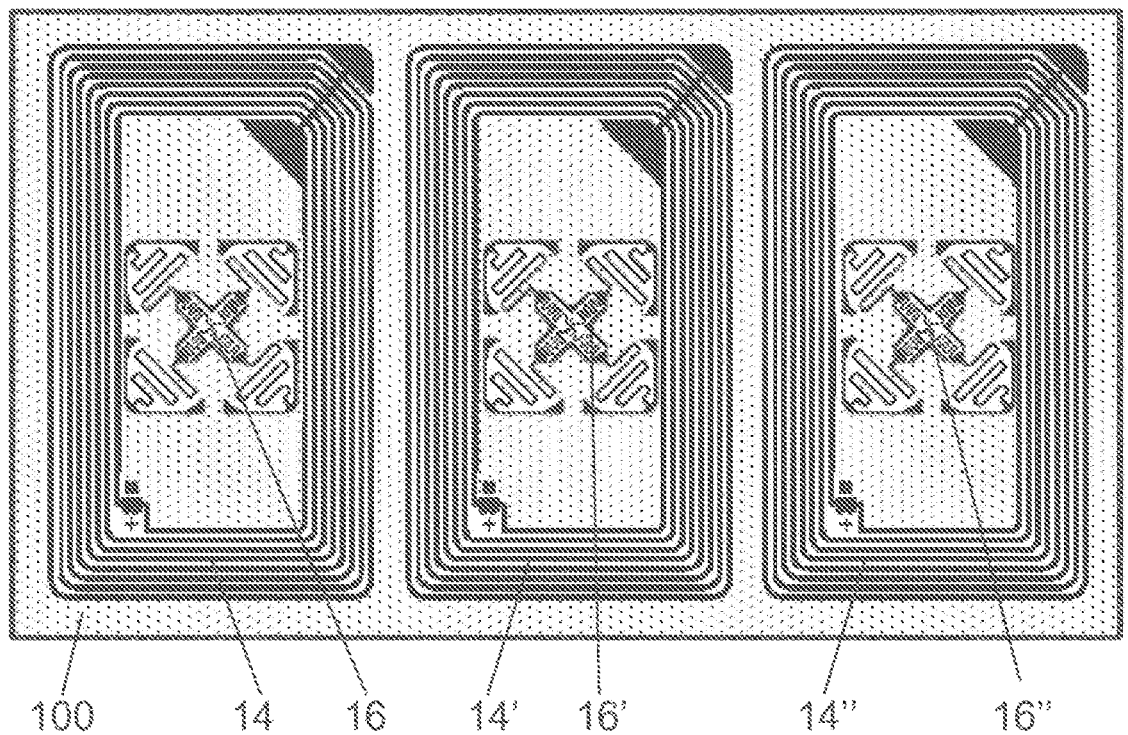
FIG. 8 shows an antenna structure which, in addition to induction loops in the form of flat coils, comprises multiple turnstile antennas.

As shown in FIG. 8, such turnstile antennas 16 are formed from at least two dipoles, which are rotated relative to each other, preferably by 90°. Here, as an example, turnstile antennas 16, 16' 16" are shown which have a meander structure in the region of their ends, wherein the dipoles are approximately dumbbell-shaped. Here also, "dog-bone"-shaped dipoles could also alternatively form a turnstile antenna 16, 16' 16". Since more than two dipoles can also be rotated relative to each other and overlaid, crossed dipoles consisting of more than two dipoles can be used.

The turnstile antennas 16, 16' 16" here are arranged on the same flexible printed circuit board 100 as the induction loops 14, 14' 14". Thus, such an antenna structure with induction loops 14, 14' 14" and turnstile antennas 16, 16' 16" can form a casing wall 100 of the wirelessly rechargeable energy store 1. The wrapping is performed as described above. The induction loops 14, 14' 14" and turnstile antennas 16, 16' 16" are metal structures, which are preferably printed onto the printed circuit board 100. Flat coils 14 and turnstile antennas 16 can also be produced separately, however, and then fixed to the printed circuit board 100 before the wrapping of the storage core 11 and the rest of the components is carried out.

Preferably, the induction loops, 14 the dipoles 15 and the turnstile antenna 16, as parts of the antenna structure, should each have a separate converter 12 or rectifier connected downstream, so that their output signals can be added or selected by switching. A combination of the antenna structure parts induction loops 14, dipoles 15 and turnstile antennas 16 with a single converter 12 is feasible, but it is more difficult to implement this arrangement without mutual detuning of the antenna parts.

A spacing layer of a few millimetres or more can be provided between the storage core 11 and the casing wall 100 and/or the antenna structure parts, wherein in addition to an air gap a layer of a plastic which is permeable to RF-signals, which is known to the person skilled in the art, is also suitable.

LIST OF REFERENCE NUMERALS 1 wirelessly rechargeable energy store
10 housing
100 casing wall/printed circuit board
A longitudinal extent
U circumferential extent
h height
11 storage core
12 converter
13 charging electronics
Antenna structures on printed circuit board/casing wall
14 induction loop
S loop longitudinal extent
Q loop transverse extent
140 induction coil
15 dipole
16 turnstile antenna
P positive terminal
N negative terminal
L longitudinal axis

The invention claimed is:

1. A wirelessly rechargeable energy store, comprising a housing, having a casing wall, in which a converter, a storage core, charging electronics and an antenna structure are arranged along a longitudinal axis,
wherein the antenna structure comprises at least two induction loops formed as flat coils, which are arranged in a partly overlapping manner on a flexible printed circuit board,
wherein the printed circuit board together with the at least two induction loops at least partly encloses the storage core in such a way that loop longitudinal extents run at least approximately parallel to the longitudinal axis and loop transverse extents run at least approximately perpendicularly to the longitudinal axis and a first pole of the induction loops is connected to a first pole of the converter and a second pole of the induction loops is connected to a second pole of the converter,
wherein the antenna structure further comprises at least one dipole, and
wherein the dipole is arranged on the printed circuit board and is connected to at least one converter and/or the charging electronics.

2. The wirelessly rechargeable energy store according to claim 1, wherein the at least two induction loops are arranged on a surface of the flexible printed circuit board and the printed circuit board is bent around the storage core in such a way that a rear of the flexible printed circuit board forms the outer surface of the casing wall.

3. The wirelessly rechargeable energy store according to claim 2, wherein the at least two induction loops are formed from an electrically conductive wire and are fixed onto the flexible printed circuit board or printed onto the flexible printed circuit board.

4. The wirelessly rechargeable energy store according to claim 1, wherein three or more induction loops are mounted in a partially overlapping manner in the housing, wrapped around the longitudinal axis and the storage core.

5. A wirelessly rechargeable energy store, comprising a housing, having a casing wall, in which a converter, a storage core, charging electronics and an antenna structure are arranged along a longitudinal axis,
wherein the antenna structure comprises at least two induction loops formed as flat coils, which are arranged in a partly overlapping manner on a flexible printed circuit board,
wherein the printed circuit board together with the at least two induction loops at least partly encloses the storage core in such a way that loop longitudinal extents run at least approximately parallel to the longitudinal axis and loop transverse extents run at least approximately perpendicularly to the longitudinal axis and a first pole of the induction loops is connected to a first pole of the converter and a second pole of the induction loops is connected to a second pole of the converter,
wherein the antenna structure further comprises at least one turnstile antenna, and
wherein the at least one turnstile antenna is formed from at least two dipoles rotated relative to each other, arranged on the printed circuit board and connected to the charging electronics.

6. The wirelessly rechargeable energy store according to claim 5, wherein the at least one turnstile antenna is arranged in the centre of each induction loop, which is free of conductor tracks.

7. The wirelessly rechargeable energy store according to claim 1, wherein the antenna structure is formed by at least two partially overlapping flat coils, which preferably overlap along the casing wall by 20% and more of their surface area.

8. The wirelessly rechargeable energy store according to claim 1, wherein the dipoles have conductor tracks running in a meandering manner in the area of their ends, wherein the length of the conductor tracks is matched to the absorbing wavelength of the radiation.

9. The wirelessly rechargeable energy store according to claim 1, wherein the dipoles are designed dumbbell-shaped or integrally in the form of known "dog-bone"-shaped dipoles.

10. The wirelessly rechargeable energy store according to claim 1, wherein the at least one dipole is arranged in the centre of each induction loop, which is free of conductor tracks.

11. The wirelessly rechargeable energy store according to claim 1, wherein the at least two induction loops are fixed to the casing wall in such a way that the orientation of the loop longitudinal extent is tilted towards the longitudinal extent of the casing wall and thus relative to the longitudinal axis.

12. The wirelessly rechargeable energy store according to claim 1, wherein the housing or the casing wall has the form of a battery case in accordance with the ANSI standard and the energy store is operable in different small electrical appliances.

13. The wirelessly rechargeable energy store according to claim 1, wherein the storage core is a super-capacitor.

14. A production method for a wirelessly rechargeable energy store having a housing and a longitudinal axis, comprising a converter, a storage core, a charging electronics and an antenna structure, the method comprising:
arranging and electrically connecting the converter, the storage core and the charging electronics to one another,
electrically connecting an antenna structure of at least two induction loops in the form of flat coils to a first terminal of the converter, wrapping with a flexible printed circuit board as a casing wall, on one surface of which the at least two induction loops are arranged, to thereby surround the storage core coaxially to the longitudinal axis, electrically connecting the at least two induction loops to the corresponding second terminal of the converter, and sealing the housing by connection of the ends of the casing wall which is formed by the flexible printed circuit board, wherein the outer surface of the printed circuit board forms the housing outer surface of the wirelessly rechargeable energy store.

15. The production method according to claim 14, wherein the at least two induction loops are fixed on the inside of the casing wall and the wrapping of the casing wall and the induction loops takes place in a single process step before the electrical connection of the second pole of the induction loop to the converter and the closure of the housing takes place by further wrapping of the casing wall around the storage core.

16. The production method according to claim 14, wherein the at least two induction loops are fixed to the inside of the casing wall by an adhesive, adhesive film or imprinting.

17. The production method according to claim 14, wherein the two ends of the casing wall are connected by welding or bonding, which results in the closed housing.

* * * * *